United States Patent
Zhang et al.

(10) Patent No.: US 12,414,184 B2
(45) Date of Patent: Sep. 9, 2025

(54) METHOD PERFORMED BY USER EQUIPMENT, AND USER EQUIPMENT

(71) Applicant: Sharp Kabushiki Kaisha, Sakai (JP)

(72) Inventors: Chongming Zhang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 331 days.

(21) Appl. No.: 18/039,736

(22) PCT Filed: Dec. 2, 2021

(86) PCT No.: PCT/CN2021/135060
§ 371 (c)(1),
(2) Date: Jun. 1, 2023

(87) PCT Pub. No.: WO2022/117033
PCT Pub. Date: Jun. 9, 2022

(65) Prior Publication Data
US 2024/0008122 A1    Jan. 4, 2024

(30) Foreign Application Priority Data
Dec. 3, 2020  (CN) .......... 202011396996.4

(51) Int. Cl.
*H04W 76/10*  (2018.01)
*H04W 48/20*  (2009.01)
*H04W 76/19*  (2018.01)

(52) U.S. Cl.
CPC ........... *H04W 76/19* (2018.02); *H04W 48/20* (2013.01)

(58) Field of Classification Search
CPC ..... H04W 8/005; H04W 40/22; H04W 48/20; H04W 76/11; H04W 76/12; H04W 76/14;
(Continued)

(56) References Cited

U.S. PATENT DOCUMENTS

| | | | |
|---|---|---|---|
| 10,129,902 B2 * | 11/2018 | Kaur ............... | H04W 76/18 |
| 11,672,033 B2 * | 6/2023 | Pan ............... | H04W 76/19 |
| | | | 370/254 |

(Continued)

FOREIGN PATENT DOCUMENTS

| | | |
|---|---|---|
| CN | 105451282 A | 3/2016 |
| CN | 111800837 A | 10/2020 |

OTHER PUBLICATIONS

Official Communication issued in International Patent Application No. PCT/CN2021/135060, mailed on Feb. 21, 2022.

(Continued)

*Primary Examiner* — Frank Duong
(74) *Attorney, Agent, or Firm* — Keating & Bennett, LLP

(57) ABSTRACT

Provided in the present invention are a method performed by user equipment, and user equipment. A method performed by user equipment is a method of an RRC connection re-establishment procedure performed by user equipment (UE), and includes the following steps: triggering or initiating, by the UE, an RRC connection re-establishment procedure; during initiation of the RRC connection re-establishment procedure, starting, by the UE, a timer T311, and performing cell selection or relay selection; and in the case that the UE has selected a suitable cell or the UE has selected a suitable relay, stopping, by the UE, T311, wherein the suitable cell is a cell of which a measured value or a level value meets a cell selection rule, and the suitable relay is a relay of which a measured value or a level value meets a relay selection rule.

2 Claims, 2 Drawing Sheets

(58) Field of Classification Search
CPC ..... H04W 76/18; H04W 76/19; H04W 76/27; H04W 88/02; H04W 88/04
See application file for complete search history.

(56) References Cited

U.S. PATENT DOCUMENTS

| | | | |
|---|---|---|---|
| 11,863,381 B2* | 1/2024 | Bao | H04W 76/15 |
| 12,213,009 B2* | 1/2025 | Wu | H04W 76/18 |
| 12,245,307 B2* | 3/2025 | Chang | H04W 80/02 |
| 2017/0244468 A1 | 8/2017 | Zhao | |
| 2018/0070281 A1 | 3/2018 | Wu et al. | |
| 2018/0139682 A1 | 5/2018 | Xu et al. | |
| 2020/0178343 A1* | 6/2020 | Kim | H04W 76/27 |
| 2021/0051758 A1* | 2/2021 | Xu | H04W 76/19 |
| 2022/0167240 A1 | 5/2022 | Liang et al. | |
| 2022/0174758 A1* | 6/2022 | Pan | H04W 76/19 |
| 2024/0049325 A1* | 2/2024 | Pan | H04W 76/19 |

OTHER PUBLICATIONS

CATT, "Relay UE reselection", 3GPP TSG RAN WG2 Meeting #90, R2-152317, May 25-29, 2015, pp. 1-2.
OPPO, "Discussion on SL relay (re)selection and authorization", 3GPP TSG-RAN WG2 #111-e, R2-2006770, Aug. 2020, pp. 1-4.

\* cited by examiner

METHOD PERFORMED BY USER EQUIPMENT, AND USER EQUIPMENT

TECHNICAL FIELD

The present invention relates to the technical field of wireless communications. More specifically, the present invention relates to a method performed by user equipment, and corresponding user equipment.

BACKGROUND

To provide a service, in a scenario, a remote UE may be communicatively connected to a base station via a relay UE.

After the remote UE establishes an RRC connection to the base station via the relay UE, the remote UE is in an RRC connected state. In the following cases, the remote UE may trigger an RRC connection re-establishment procedure.

Case 1: a connection between the remote UE and the relay UE fails. For example, the remote UE detects that the number of HARQ retransmissions has exceeded a preset threshold.

Case 2: the remote UE receives a switch/handover command transmitted by the base station to the remote UE, to switch/hand over the remote UE from the current relay UE connected thereto to another relay UE (target relay UE) or to a cell (a target cell). However, the remote UE fails in establishing a connection to the target relay UE or the target cell, resulting in a switch/handover failure.

In the prior art, UE performs only cell selection while performing an RRC connection re-establishment procedure, and when a suitable cell is selected, access is initiated in this cell. However, for remote UE, a re-establishment procedure should consider a case in which there is candidate relay UE around. Therefore, the problem as to how remote UE performs an RRC connection re-establishment procedure needs to be addressed.

SUMMARY

Provided in the present invention is a solution to the following problem. That is, a solution is provided to address the problem as to how remote UE performs an RRC connection re-establishment procedure.

According to an aspect of the present invention, provided is a method performed by user equipment, being a method of an RRC connection re-establishment procedure performed by user equipment (UE), comprising the following steps:

triggering or initiating, by the UE, an RRC connection re-establishment procedure;

during initiation of the RRC connection re-establishment procedure, starting, by the UE, a timer T311, and performing cell selection or relay selection; and in the case that the UE has selected a suitable cell or the UE has selected a suitable relay, stopping, by the UE, T311, wherein the suitable cell is a cell of which a measured value or a level value meets a cell selection rule, and the suitable relay is a relay of which a measured value or a level value meets a relay selection rule.

In the above method performed by user equipment, preferably, non-remote UE performs only cell selection;
remote UE out of coverage performs only relay selection; and
remote UE in coverage is capable of performing cell selection and relay selection.

In the above method performed by user equipment, preferably, the UE capable of performing cell selection and relay selection performs selection in the following sequence:
performing cell selection first, and when a cell selection result is that there is no suitable cell, then performing relay selection;
performing relay selection first, and when a relay selection result is that there is no suitable relay, then performing cell selection; or
performing, by the UE, cell selection and relay selection according to an instruction from a network side.

In the above method performed by user equipment, preferably, the instruction from the network side received by the UE is carried in a reconfiguration message, and the reconfiguration message further carries information about a switch/handover or synchronization to a target relay or a target cell.

In the above method performed by user equipment, preferably, the instruction information directly instructs the UE to perform only cell selection, or to perform only relay selection, or to perform cell selection first and then perform relay selection, or to perform relay selection first and then perform cell selection; or,
the instruction information is used to assist the UE in determining the sequence or order of performing cell selection and relay selection.

In the above method performed by user equipment, preferably, the UE determines the priorities of performing relay selection and cell selection according to the received reconfiguration message carrying the information about the switch/handover or synchronization to the target relay or the target cell.

In the above method performed by user equipment, preferably, in the case that a suitable relay has been selected and a PC5 connection thereto has been established, the UE stops T311, which comprises the following two cases:
in the case that the UE has selected a suitable relay first, but no PC5 connection has been established between the UE and the selected suitable relay, the UE stops T311 after establishing a PC5 connection to the relay; and
in the case that the UE determines that one of relays to which the UE has established PC5 connections is a suitable relay, the UE stops T311.

In the above method performed by user equipment, preferably, when T311 expires, a parameter related to cell selection and/or relay selection is set according to the type of the UE,
wherein the type of the UE is a manner in which the UE is connected to a base station, or remote UE or non-remote UE, or whether the UE is in coverage or out of coverage.

In the above method performed by user equipment, preferably, when the UE selects a suitable cell, the UE starts a timer T301;
when the UE selects a suitable relay, a timer T301-X is started;
when T301 or T301-X expires, the UE enters an idle state.

According to another aspect of the present invention, user equipment is provided, comprising:
   a processor; and
   a memory storing instructions,
     the instructions, when run by the processor, cause the user equipment to perform the method described above.

The method performed by user equipment and corresponding user equipment according to the present disclosure can enable UE to perform an RRC connection re-establishment procedure appropriately.

DETAILED DESCRIPTION

Figure 1:
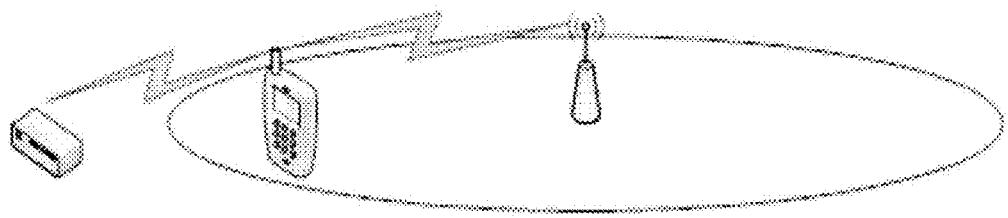
FIG. 1 is a schematic diagram showing a scenario of communication between a remote UE, a relay UE, and a base station.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
   NR: New Radio
   LTE: Long Term Evolution
   eLTE: enhanced Long Term Evolution
   RRC: Radio Resource Control (layer)
   MAC: Medium Access Control (layer)
   MAC CE: MAC Control Element
   SDAP: Service Data Adaptation Protocol A plurality of embodiments according to the present invention are specifically described below, with an NR mobile communications system and its subsequent evolved version serving as exemplary application environments, and with a base station and UE that support NR serving as examples. However, it should be noted that the present invention is not limited to the following embodiments, but is applicable to more other wireless communications systems, such as an eLTE communication system, or an NB-Iot system, or an LTE-M system. Moreover, the present invention may be applicable to other base stations and user equipment, such as base stations and user equipment supporting eLTE/NB-Iot/LTE-M.

Near Field Communication

Remote UE and relay UE are wirelessly connected in a near field communication manner, and transmit data or signaling. The near field communication manner mentioned herein primarily refers to a sidelink connection. A WIFI connection or other connection manners are also allowed. A sidelink connection-based reference point between UE and UE is referred to as PC5, so that a connection between the remote UE and the relay UE may be referred to as a PC5 connection.

Uu RRC Connection and State

A reference point between UE and a radio access network is referred to as Uu, so that a connection between the UE and the radio access network is referred to as a Uu connection. In a Uu connection, depending on the state of a Uu RRC connection, the state of UE can be an idle state (RRC_IDLE state), an inactive state (RRC_INACTIVE state), or a connected state (RRC_CONNECTED state). After an RRC connection is established, the UE may be in the INACTIVE or CONNECTED state. If no RRC connection is established, the UE is in the IDLE state.

After an RRC connection is established between the remote UE and the radio access network, the remote UE may be in the INACTIVE or CONNECTED state, and if no RRC connection is established, the UE is in the IDLE state. Similarly, the relay UE may also be in one of these three states.

It should be noted that when the remote UE is in the RRC connected state, the relay UE must be in the RRC connected state, and when the remote UE is in the RRC INACTIVE/IDLE state, the relay UE may be in any one of the three states, i.e., the RRC connected state and INACTIVE/IDLE state.

In addition, the PC5 connection between the remote UE and the relay UE does not affect the Uu connection of the remote UE or the relay UE, and the two connections are independent of each other.

RRC Connection Re-Establishment Procedure

In the prior art, when an RRC connection re-establishment procedure is triggered, UE starts a timer T311, and performs cell selection. If there is no suitable cell at any time, then when T311 expires, the UE performs corresponding operation, and enters the IDLE state, and a reason value of RRC connection release may be set to an RRC connection failure.

A typical scenario described herein is shown in FIG. 1. The left is a remote UE. The middle is a relay UE. The right is a base station, and represents a radio access network communicating with the relay UE. The remote UE and the relay UE are connected to each other via PC5. An ellipse represents a coverage range of the base station. Since the remote UE is not within the coverage range of the base station, the remote UE cannot communicate directly with the base station, and the relay UE is required to provide a relay service. Such remote UE is remote UE out of coverage.

Figure 2:
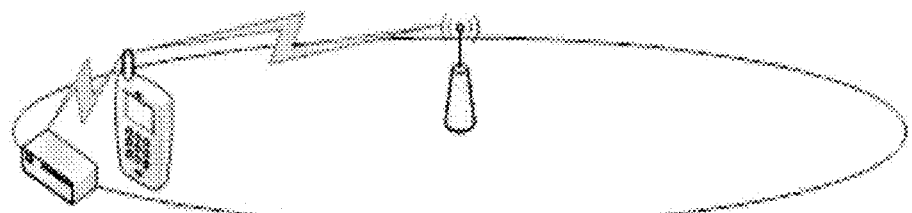
FIG. 2 is a schematic diagram showing another scenario of communication between a remote UE, a relay UE, and a base station.

Another typical scenario described herein is shown in FIG. 2. The left is a remote UE. The middle is a relay UE. The right is a base station, and represents a radio access network communicating with the relay UE. The remote UE and the relay UE are connected to each other via PC5. An ellipse represents a coverage range of the base station. The remote UE is at an edge of coverage of the base station. Since signals of the base station are weak, the remote UE cannot communicate directly with the base station, and the relay UE is required to provide a relay service. Such remote UE is remote UE in coverage.

Embodiment 1

Figure 3:
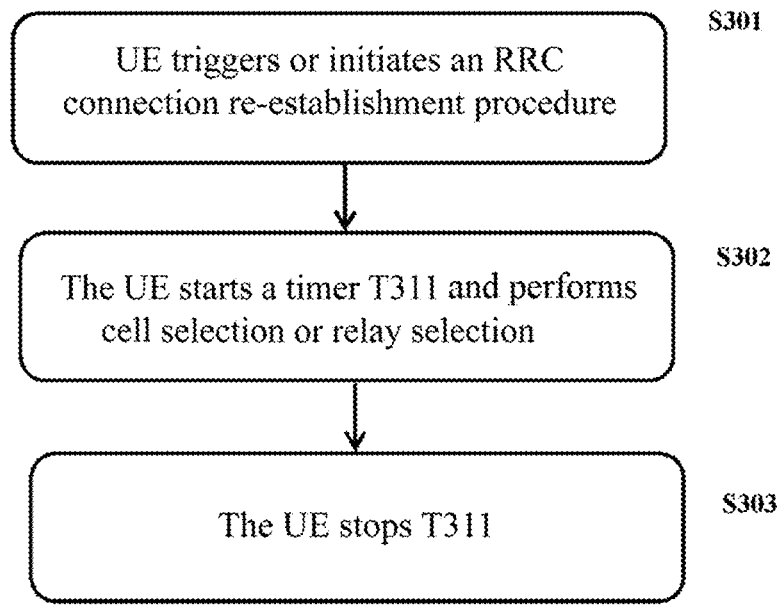
FIG. 3 is a flowchart showing a method performed by user equipment according to an embodiment of the present invention.

As shown in FIG. 3, this embodiment provides a method performed by user equipment, being a method of an RRC connection re-establishment procedure performed by user equipment.

Step one: triggering or initiating, by UE, an RRC connection re-establishment procedure (see step S301).

When the UE is in any one the following cases, the RRC connection re-establishment procedure may be triggered or initiated, which is not limited herein:

upon detecting radio link failure;
upon reconfiguration with sync failure; and
upon integrity check failure.

Step two: during initiation of the RRC connection re-establishment procedure, starting, by the UE, a timer T311, and performing cell selection or relay selection (see step S302). Existing T311 is used herein as an example, and a newly defined timer for RRC connection re-establishment is also allowed.

Preferably, non-remote UE performs only cell selection.

Preferably, remote UE may perform cell selection and relay selection.

Preferably, remote UE out of coverage performs only relay selection, and remote UE in coverage may perform cell selection and relay selection.

The UE that may perform cell selection and relay selection may perform selection in a sequence including the following operations:

Cell selection is performed first, and when a cell selection result is that there is no suitable cell, relay selection is performed. Preferably, the UE performs cell selection first, and starts a timer 1. If a cell selection result is that there is not suitable cell when the timer 1 expires, the UE performs relay selection. If the cell selection result is that a suitable cell has been selected during running of the timer 1, the UE stops the timer 1. That is, the UE performs cell selection first within a period of time, and performs relay selection in the case that there is no suitable cell. When a set duration of the timer 1 is infinite, it may be considered that the UE performs only cell selection. When the set duration of the timer 1 is 0, it may be considered that the UE performs only relay selection.

Relay selection is performed first, and when a relay selection result is that there is no suitable relay, cell selection is performed. Preferably, the UE performs relay selection first, and starts a timer 2. If a relay selection result is that there is not suitable relay when the timer 2 expires, the UE performs cell selection. If the cell selection result is that a suitable relay has been selected during running of the timer 2, the UE stops the timer 2. That is, the UE performs relay selection first within a period of time, and performs cell selection in the case that there is no suitable relay. When a set duration of the timer 2 is infinite, it may be considered that the UE performs only relay selection. When the set duration of the timer 2 is 0, it may be considered that the UE performs only cell selection.

The timer 1 and the timer 2 may be the same timer.

Further, the UE may also perform cell selection and relay selection according to an instruction from a network side. The UE may receive an instruction from the network side. Such an instruction may be carried in a reconfiguration message. Preferably, such a reconfiguration message further carries information about a switch/handover or synchronization to a target relay or a target cell.

A displayed instruction manner may be: the instruction information may directly instruct the UE to perform only cell selection, or to perform only relay selection, or to perform cell selection first and then perform relay selection, or to perform relay selection first and then perform cell selection. The instruction information may also be information used to assist the UE in determining the sequence or order of performing cell selection and relay selection, e.g., priority information of cell selection or relay selection. For example, the priority of relay selection is set to be higher than the priority of cell selection, so that on the basis of the instruction information, the UE always performs relay selection preferentially; otherwise, the UE performs cell selection preferentially.

An implicit instruction manner may be: the UE determines the priorities of performing relay selection and cell selection according to the received reconfiguration message carrying the information about the switch/handover or synchronization to the target relay or the target cell. For example, the reconfiguration message received by the UE carries the information about the synchronization (or the switch/handover) to the target relay, so that when the reconfiguration for synchronization fails, a re-establishment procedure is initiated. In the procedure, the UE performs relay selection preferentially. As another example, the reconfiguration message received by the UE carries the information about the synchronization to the target cell, so that when the reconfiguration for synchronization fails, a re-establishment procedure is initiated, and the UE performs cell selection preferentially in the procedure.

Step three: stopping, by the UE, T311 in one of the following cases (see step S303):

the UE has selected a suitable cell; and
the UE has selected a suitable relay.

A suitable cell refers to a cell of which a measured value or a level value meets a cell selection rule.

A suitable cell may mean that a received level value of the UE in the selected cell meets a certain criterion e.g., an existing criterion S. Such a received level value may be calculated according to a measured value of the received level in the cell, such as RSRP or RSRQ, or other methods, which is not limited herein.

A suitable relay refers to a relay of which a measured value or a level value meets a relay selection rule.

A suitable relay may be:

The UE measures/detects a wireless signal of a PC5 interface, for example, a measured value acquired by measuring wireless signal strength of a sidelink discovery message. When the measured value or a level value calculated on the basis of the measured value meets the relay selection criterion, the relay may be identified as a suitable relay. Alternatively, the UE measures an RSRP value of a sidelink unicast connection, and when the measured value or a level value calculated on the basis of the measured value meets the relay selection criterion, the relay may be identified as a suitable relay. Herein, the relay selection criterion may be that a measured value or a level value is not less than a preset threshold, etc.

Preferably, in the case that a suitable relay has been selected and a PC5 connection thereto has been established, the UE stops T311. This includes two cases:

Case one: if the UE has selected a suitable relay first, but no PC5 connection has been established between the UE and the selected suitable relay, the UE stops T311 after establishing a PC5 connection to the relay.

Case two: if the UE determines that one of relays to which the UE has established PC5 connections is a suitable relay, the UE may stop T311.

Additionally in this solution, if the UE cannot select any suitable relay or any suitable cell at any time, the UE enters an idle state when T311 expires.

Embodiment 2

On the basis of Embodiment 1, when T311 expires, a parameter related to cell selection and/or relay selection is set according to the type of the UE. Herein, the type of UE preferably refers to a manner in which the UE is connected to a base station. For example:

when the UE is connected to the base station directly by a Uu port, the UE sets the value of a parameter nosuitableCellFound to true in the case that T311 expires, and the parameter is recorded in a report provided by the UE to the base station.

When the UE is connected to the base station via a relay UE, that is, the UE is connected to the base station indirectly, the UE may not set the value of the parameter nosuitableCellFound to true in the case that T311 expires, or the UE may further set the value of a parameter nosuitablerelayFound to true in the case that T311 expires. Preferably, the UE considers an actual situation. If the UE has performed cell selection in a re-establishment procedure, the UE sets the value of the parameter nosuitableCellFound to true in the case that T311 expires. If the UE has also performed relay selection in the re-establishment procedure, the UE may further set the value of the parameter nosuitablerelayFound to true in the case that T311 expires.

Herein, nosuitableCellFound refers to a parameter used to record that there is no suitable cell, and nosuitablerelayFound refers to a parameter used to record that there is no suitable relay. When the values of the parameters are true, it is indicated that there is no suitable cell/relay, and when the values of the parameters are false, it is indicated that there is a suitable cell/relay.

Herein, the type of the UE may also refer to remote UE or non-remote UE. The so-called remote UE refers to UE that establishes an RRC connection to a base station via a relay. The non-remote UE refers to UE that does not establish an RRC connection to a base station via a relay, or UE communicating with a base station directly at the Uu port. For example:

For remote UE, the UE may not set the value of the parameter nosuitableCellFound to true in the case that T311 expires, or the UE may further set the value of the parameter nosuitablerelayFound to true in the case that T311 expires. Preferably, the UE considers an actual situation. If the UE has performed cell selection in a re-establishment procedure, the UE sets the value of the parameter nosuitableCellFound to true in the case that T311 expires. If the UE has also performed relay selection in the re-establishment procedure, the UE may further set the value of the parameter nosuitablerelayFound to true in the case that T311 expires.

For non-remote UE, the UE sets the value of the parameter nosuitableCellFound to true in the case that T311 expires.

In addition, the type of UE may also refer to whether the UE is in coverage or out of coverage. For example, For UE in coverage, the UE sets the value of the parameter nosuitableCellFound to true in the case that T311 expires, and optionally, if the UE has also performed relay selection, the UE sets the value of the parameter nosuitablerelayFound to true.

For UE out of coverage, the UE sets the value of the parameter nosuitablerelayFound to true in the case that T311 expires.

Embodiment 3

On the basis of Embodiment 1, when UE selects a suitable cell, the UE starts a timer T301, and when UE selects a suitable relay, a timer T301-X is started. Alternatively, this embodiment may be used separately in an RRC re-establishment procedure when UE selects a suitable relay. Existing T301 is used herein as an example, and a newly defined timer for RRC connection re-establishment is also allowed.

The values of T301 and T301-X may be broadcast in system information or transmitted to the UE via dedicated signaling.

When T301 or T301-X expires, the UE enters an idle state.

Another implementation manner of this solution may be as follows:

When the UE selects a suitable cell, the UE sets the value of T301 to a value broadcast in system information or a value included in an information element spcellconfig, and then starts the timer T301.

When the UE selects a suitable relay, the UE sets the value of T301 to a value for remote UE broadcast in system information or a value for T301 included in a switch/handover command received by the UE and used to instruct the UE to be switched/handed over from a current relay or serving cell to a target relay, and then starts the timer T301.

Additionally in this solution, when the UE receives an RRC connection re-establishment message, the running timer T301 or T301-X may be stopped.

Figure 4:
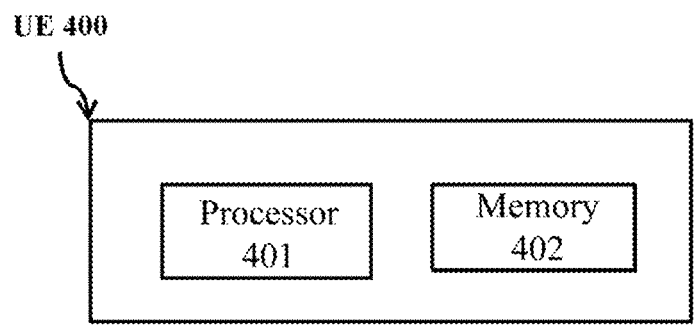
FIG. 4 is a schematic structural block diagram of user equipment according to the present invention.

FIG. 4 is a schematic structural block diagram of user equipment according to the present invention. As shown in FIG. 4, the user equipment (UE) 40 includes a processor 401 and a memory 402. The processor 401 may include, for example, a microprocessor, a microcontroller, an embedded processor, and the like. The memory 402 may include, for example, a volatile memory (such as a random access memory (RAM)), a hard disk drive (HDD), a non-volatile memory (such as a flash memory), or other memories. The memory 402 stores program instructions. The instructions, when run by the processor 401, can perform the above method performed by user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A method performed by user equipment, the method comprising:

starting a first timer and performing a selection, upon initiating a Radio Resource Control (RRC) connection re-establishment procedure;

upon performing the selection, stopping the first timer and starting a second timer, regardless of whether the selection is a suitable cell selection or a suitable relay selection, wherein, in a case where the suitable cell selection is performed, the second timer is started with use of a first value, and in a case where the suitable relay selection is performed, the second timer is started with use of a second value; and stopping the second timer upon reception of an RRC reestablishment message.

2. A user equipment, comprising:

a processor; and a memory storing instructions, wherein the instructions, when run by the processor, cause the user equipment to:

start a first timer and perform a selection, upon initiating a Radio Resource Control (RRC) connection re-establishment procedure;

upon performing the selection, stop the first timer and start a second timer, regardless of whether the selection is a suitable cell selection or a suitable relay selection, wherein, in a case where the suitable cell selection is performed, the second timer is started with use of a first value, and in a case where the suitable relay selection is performed, the second timer is started with use of a second value; and stop the second timer upon reception of an RRC reestablishment message.

* * * * *